United States Patent Office 3,646,152
Patented Feb. 29, 1972

3,646,152
METHOD OF PREPARING AN ALUMINA CATALYST CONTAINING CHLORINE AND ISOMERIZATION PROCESS UTILIZING THE SAME
Robert M. Suggitt and John H. Estes, Wappingers Falls, and Stanley Kravitz, Wiccopee, N.Y., assignors to Texaco Inc., New York, N.Y.
No Drawing. Filed May 12, 1969, Ser. No. 823,970
Int. Cl. C07c 5/30; B01j 11/78
U.S. Cl. 260—683.68
11 Claims

ABSTRACT OF THE DISCLOSURE

A hydrocarbon containing 4 to 7 carbon atoms is isomerized with an alumina catalyst containing chlorine and which may also include a metal from the group; ruthenium, rhodium, palladium and platinum. The chlorine is introduced to the alumina in amounts of 3–12% by contacting the alumina with a combination of molecular chlorine and an organic compound, such as formaldehyde, methyl alcohol or methyl mercaptan, at 400–750° F.

BACKGROUND OF THE INVENTION

Highly active catalysts prepared by the alkylation of alumina with certain organic chloride activating agents are described in U.S. Pat. 3,240,840, in British Pat. 953,187 and in application Ser. No. 419,755, filed Dec. 21, 1964, which issued as U.S. Pat. 3,551,516 on Dec. 29, 1970. These catalysts are prepared by chloriding alumina or composites of alumina and platinum, the latter comprising a major portion of alumina and about 0.01 to 1.0 percent by weight platinum. The platinum is added by any of various well known methods including, for example, impregnation with a water soluble platinum-containing compound such as chloroplatinic acid or precipitation of platinum as sulfide by passing hydrogen sulfide through an aqueous solution of a platinum compound. The alumina or platinum-alumina composite is thereafter activated by treatment with an organic chloride activating agent for example a chloroalkane corresponding to the general formula:

or an acid chloride under conditions effecting reaction of at least a portion of said activating agent with the alumina or at least one component of the platinized alumina composite.

Broadly, this invention contemplates a hydrocarbon conversion process which comprises contacting a hydrocarbon at conversion conditions with a catalyst comprising alumina and chlorine, said chlorine present in an amount of from about 3.0 to 12.0 weight percent of said catalyst wherein said chlorine is introduced into said catalyst by contacting said alumina at a temperature within the range of about 400 to 750° F. with a combination of chlorine and an organic compound selected from the group consisting of formaldehyde, methyl alcohol and methyl mercaptan wherein the mole ratio of molecular chlorine to said organic compound is at least 1.5:1.

It has now been found that formaldehyde, methyl alcohol or methyl mercaptan will, in an atmosphere containing molecular chlorine, render aluminas active for the conversion of hydrocarbons when contacted therewith. The preferred compound is methyl alcohol.

The organic activating agent may be added in liquid form to the alumina and the mixture thereafter heated in the presence of chlorine. The catalyst may be produced in pellet, granular, bead or pulverulent form to facilitate its use in fixed beds, moving beds or fluidized solid beds as is well known in the art. Additionally, it has been found that the activating method and agents described above are highly effective with alumina containing catalytic amounts of palladium group metals including ruthenium, rhodium, and palladium as well as alumina containing platinum. This group includes the transition elements of Group VIII having not more than 1 electron in the unfilled outer shell. An advantageous use of ruthenium is that the chloride is of a relatively low volatility so that more severe activation and stabilization techniques and processing conditions may be employed.

In accordance with our method of activation, alumina or a composite containing alumina and about 0.01 to 2.0 weight percent of a palladium group metal or platinum is simultaneously contacted with chlorine and an organic activating agent as hereinabove described to introduce within the range of about 3.0 to 12.0 percent chlorine by weight onto the catalyst. The aluminas contemplated for activation with the combination of chlorine and organic activating agent are gamma or eta aluminas having a surface area of from about 100 to 450° m.²/g. Aluminas possessing surface areas of about 100 m.²/g. are employed preferably in such hydrocarbon conversion reactions as alkylation; those possessing surface areas of about 150 m.²/g. are preferably employed in polymerization or hydrogenation and aluminas having surface areas of about 250 to 400 m.²/g. are preferred in isomerization. Further, the contemplated aluminas contain from about 0.5 to 3.0 and preferably about 1.5 to 2.4 percent by weight of water present as a mono-layer of hydroxyl groups on the alumina surface. One method of providing the aforemetioned alumina possessing the designated surface area and percent water is by heating eta or gamma alumina in a flowing inert gaseous stream at temperatures ranging from about 800 to 1250° F. for periods of 24 to one-half hours. Such conditions are sufficient to provide the alumina with the prescribed water content without sintering the surface thereof. Composites of alumina and a palladium group metal or platinum are provided with similar ranges of surface area and combined water by calcining the composite under the conditions set out above.

As provided herein, activation is accomplished by contacting the alumina or alumina composite with a combination of chlorine and organic activating agent wherein the mole ratio of molecular chlorine to activating agent is at least 1.5:1 and where the mole ratio may range as high as 100:1. Preferably the mole ratio of molecular chlorine to activating agent ranges from about 2:1 to 10:1. In highly preferred embodiments, the mole ratio of chlorine to organic activator where the activator is formaldehyde is at least 2:1. In those instances where the activator is methyl alcohol, we prefer to employ mole ratios of at least 3:1.

The activation in the presence of the designated organic activator and chlorine may proceed at atmospheric or higher pressures and preferably pressures in the range of about atmospheric to 100 p.s.i.g. are employed. Contacting of the alumina or composite to be activated with the combination of activating agent and chlorine is effected at a temperature of about 400 to 750° F. Temperatures below 400° F. are generally insufficient to provide a highly active catalyst useful for commercial size operations. On the other hand, temperatures in excess of 750° F. tend to promote the formation of aluminum chloride or other side products as, for example, loss of platinum or other metal present and utilized in the catalyst base. Within the range above specified, we prefer to employ temperatures ranging from about 500 to 650° F. The catalyst can be prepared in situ in a hydrocarbon conversion reactor by passing the vaporized organic activator and molecular chlorine individually or together over the alumina or composite for a time sufficient to provide the catalyst with a chlorine content of from 3.0 to 12.0 weight percent chlorine where the conditions of activation are as recited above.

The chlorided alumina catalysts prepared in accordance with this invention are highly active for alkylation or polymerization at relatively low temperatures. Benzene is alkylated with ethylene in the presence of this catalyst at temperatures within the range of about 150 to 350° F. and preferably within the range of 200 to 250° F. Isobutane may be alkylated with ethylene at temperatures within the range of about 150 to 250° F. Polymerization of ethylene or propylene is undertaken at temperatures of from about 0 to 125° F. Pressures from atmospheric and higher are applicable.

Chlorided metal-alumina catalysts such as platinized alumina prepared as indicated baove have a high activity for the isomerization of isomerizable hydrocarbons, for example, paraffinic hydrocarbons illustrated by butanes, pentanes, hexanes and heptanes; and naphthenic hydrocarbon such as methylcyclopentane, cyclohexane and dimethylcyclopentane. Isomerization, for example, can be undertaken in either the liquid or vapor phase. Metal alumina catalysts prepared in accordance with this invention are also active in such additional hydrocarbon conversion reactions as hydrogenation and hydrocracking. Hydrogenation of such feedstocks as olefins and aromatics such as benzene is undertaken at temperatures of from 250 to 400° F.; hydrocracking of $C_7$ and higher hydrocarbons is conducted at temperatures of from 250 to 400° F.; hydroisomerization of cyclohexene to cyclohexane and methylpentane is accomplished at temperatures of from 250 to 400° F.

The composite metal alumina catalyst described above may be stabilized and its activity further enhanced by heating the activated catalyst to a temperature from 800 to 1000° F. in a gaseous stream inert to the system such as hydrogen, nitrogen, helium, oxygen or argon for a period of 1 to 48 hours and thereafter contacting the catalyst with hydrogen chloride gas at temperatures of from 300 to 500° F.

In a highly preferred embodiment, the platinized alumina catalysts prepared in accordance with this invention are highly active for the isomerization of hydrocarbon streams at relatively low temperatures. Streams containing $C_4$ to $C_7$ or higher hydrocarbons such as butanes, pentanes, hexanes, heptanes, cyclopentanes, cyclohexanes and alkyl cyclohexanes are isomerized at temperatures within the range of about 250 to 400° F. and preferably within the range of about 250 to 350° F. Isomerization may be effected in either the liquid or vapor phase. Pressures from atmospheric to 750 p.s.i.g. have been found convenient. A liquid hourly space velocity, i.e., the volume of liquid charge per hour per volume of catalyst within the range of about 0.5 to 10.0 and preferably within the range of about 0.75 to 4.0 is employed. Hydrogen is included in the isomerization feed and a mole ratio of hydrogen to hydrocarbon within the range of about 0.05:1 to 5:1 and preferably within the range of about 2:1 to 5:1 for pentanes and hexanes and about 0.1:1 to 1:1 for butanes.

In order to more fully illustrate the nature of our invention and manner of practicing the same, the following examples are presented. In these examples, the best mode contemplated by us for carrying out our invention is set forth.

Example 1

A composite of platinum and alumina is prepared by pilling beta-alumina trihydrate, calcining at 930° F. for 2 hours, cooling to room temperature, impregnating with an aqueous solution of chloroplatinic acid and ethylene diamine, drying and calcining at 1050° F. for 2 hours. The platinized alumina composite resulting from this treatment comprises predominantly eta-alumina containing 0.6 weight percent platinum and about 2.2 weight percent combined water. The composite, 166 grams, is maintained at a temperature of 575° F. and 4 cubic feet per hour of nitrogen carrier gas passes through the composite together with 24 grams of methyl alcohol at the rate of 1 gram per hour and chlorine is introduced at the rate of 40 cc. per minute over a period of 24 hours. The ratio of molecular chlorine to activator added to the composite was 3.4:1. The resulting catalyst is predominantly eta-alumina and contains 9.6 weight percent chlorine and 0.54 weight percent platinum. A portion of the thus treated catalyst is stabilized at 800° F. for 4 hours by passing a stream of hydrogen through the catalyst and subsequently cooling the catalyst to 500° F. and contacting the same with hydrogen chloride at the rate of one-half cubic foot per hour for 2 hours thereby reducing the chlorine content of the catalyst to 8.2 weight percent.

The catalyst so prepared, in unstabilized and stabilized form, was evaluated for n-hexane isomerization at 300° F., 300 p.s.i.g., 3.2:1 hydrogen to hydrocarbon mole ratio and a liquid hourly space velocity of 1. When employing the unstabilized catalyst total conversion of n-hexane to an isomeric form was 88.8 percent including 27.4 percent conversion to 2,2-dimethylbutane. When employing the stabilized catalyst, the total conversion of n-hexane to the isomeric forms was 88.7 percent and 25.2 percent conversion of the n-hexane to 2,2-dimethylbutane.

Example II

A composite of palladium and alumina is prepared by pilling beta alumina trihydrate, calcining at 930° F. for 2 hours, cooling to room temperature, impregnating with a palladium tetramine chloride solution and drying and calcining at 500° F. for 2 hours. The palladium-alumina composite resulting from this treatment comprises predominantly eta-alumina containing 0.3 weight percent palladium and about 2.2 weight percent combined water. The composite, 166 grams, is maintained at a temperature of 500° F. and 4 cubic feet per hour of nitrogen carrier gas passes through the composite together with 24 grams of methyl alcohol at the rate of 1 gram per hour and chlorine gas is introduced at the rate of 42 cc. per minute over a period of 24 hours wherein the mole ratio of chlorine to methyl alcohol was 3.6:1. A portion of the thus treated catalyst is stabilized at 800° F. for 4 hours by passing a stream of hydrogen through the catalyst and subsequently cooling the catalyst to 500° F. and contacting the same with hydrogen chloride gas at the rate of one-half cubic foot per hour thereby producing a catalyst having a chlorine content of 6.1 weight percent and a palladium content of 0.29 weight percent. The stabilized catalyst was contacted with normal hexane and hydrogen at hydroisomerization conditions including a reaction temperature of 300° F., a pressure of 300 p.s.i.g., a liquid hourly space velocity of 1 and a hydrogen to hydrocarbon mole ratio of 3.2:1 producing a yield of 86.2 branch chain hexane isomers including 20.7 weight percent 2,2-dimethylbutane.

Example III

A composite of platinum and alumina is prepared in accordance with Example 1 and contains 0.6 weight percent platinum and about 2.2 weight percent combined water. The composite of 166 grams is maintained at a temperature of 575° F. and 4 cubic feet per hour of nitrogen carrier gas passes through the composite together with 11.3 grams of formaldehyde and 57 grams of chlorine over a period of 24 hours. The resulting catalyst is predominantly eta alumina and contains 0.54 weight percent platinum and 5.6 weight percent chlorine. This catalyst was contacted with normal hexane and hydrogen at hydroisomerization conditions including a reaction temperature of 300° F., a pressure of 300 p.s.i.g., a liquid hourly space velocity of 1 and a hydrogen to hydrocarbon mole ratio of 3.2:1 producing a yield of 73.1 percent branch chain hexane isomers including 6.7 weight percent, 2,2-dimethylbutane.

We claim:

1. A process of isomerizing a hydrocarbon containing from 4 to 7 carbon atoms which comprises contacting said hydrocarbon and hydrogen at a reaction temperature of about 250 to 400° F., a liquid hourly space velocity of about 0.5 to 10.0 volumes of liquid hydrocarbon feed per volume of catalyst and a hydrogen to hydrocarbon mole ratio of about 0.05:1 to 5:1 with a catalyst comprising alumina and chlorine, said chlorine being present in an amount of from about 3.0 to 12.0 weight percent of said catalyst, wherein said chlorine is introduced into said catalyst by contacting said alumina at a temperature within the range of about 400 to 750° F. with a combination of molecular chlorine and an organic compound selected from the group consisting of formaldehyde, methyl alcohol and methyl mercaptan and wherein the mole ratio of molecular chlorine to said organic compound is at least 1.5:1.

2. A process according to claim 1 wherein said catalyst contains from about 0.01 to about 2.0 weight percent of a metal selected from the group consisting of rhodium, ruthenium, palladium and platinum.

3. A process according to claim 1 wherein said organic compound is formaldehyde.

4. A process according to claim 1 wherein said organic compound is methyl alcohol.

5. A method of preparing a catalyst comprising alumina and chlorine, said chlorine present in an amount of from about 3.0 to 12.0 weight percent of said catalyst which comprises contacting said alumina at a temperature within the range of about 400 to 750° F. with a combination of molecular chlorine and an organic compound selected from the group consisting of formaldehyde, methyl alcohol and methyl mercaptan wherein the mole ratio of molecular chlorine to said organic compound is at least 1.5:1.

6. A method according to claim 5 wherein said catalyst contains from about 0.01 to 2.0 weight percent of a metal selected from the group consisting of rhodium, ruthenium, palladium and platinum.

7. A method according to claim 5 wherein said organic compound is methyl alcohol.

8. A method according to claim 5 wherein said organic compound is formaldehyde.

9. A method according to claim 5 wherein said alumina is contacted with said organic compound at a pressure of about atmospheric to 100 p.s.i.g.

10. A method according to claim 5 wherein said alumina is contacted with said organic compound at a temperature of about 500 to 650° F.

11. A method according to claim 5 wherein said catalyst contains about 0.01 to 2.0 weight percent platinum and where said organic compound is methyl alcohol.

References Cited

UNITED STATES PATENTS

| | | | |
|---|---|---|---|
| 3,242,229 | 3/1966 | Estes | 260—683.68 |
| 3,440,300 | 4/1969 | Estes et al. | 260—683.68 |
| 3,449,264 | 6/1969 | Myers | 260—683.7 |
| 3,399,148 | 8/1968 | Michael et al. | 208—139 |

PAUL M. COUGHLAN, JR., Primary Examiner

G. J. CRASANAKIS, Primary Examiner

U.S. Cl. X.R.

252—441, 466